United States Patent [19]
Reynolds

[11] Patent Number: 5,213,455
[45] Date of Patent: May 25, 1993

[54] TOOL FOR REMOVING A BEARING

[75] Inventor: Warren C. Reynolds, Orange, Calif.

[73] Assignee: Kahr Bearing A Dover Diversified Company, Burbank, Calif.

[21] Appl. No.: 860,429

[22] Filed: Mar. 30, 1992

[51] Int. Cl.5 .................. B23B 41/12; B23B 47/18
[52] U.S. Cl. ................... 408/82; 29/898.01; 29/898.08; 408/93
[58] Field of Search .......... 29/898.01, 898.08; 408/82, 83.5, 87, 93, 94

[56] References Cited

U.S. PATENT DOCUMENTS

| | | | |
|---|---|---|---|
| 2,747,436 | 5/1956 | Powers | 408/82 |
| 4,017,201 | 4/1977 | Adams et al. | 408/82 |
| 4,331,410 | 5/1982 | Schnabel | 408/82 X |

Primary Examiner—Steven C. Bishop
Attorney, Agent, or Firm—Ellsworth R. Roston; Charles H. Schwartz

[57] ABSTRACT

A bearing may consist of one or more components where relative motion can take place between the bearing surface and a mating surface and where the mating surface may be a component of the bearing. Many bearings are circular and may be installed and secured in a housing by swaging an annular outer lip into an annular chamfer of the housing. A tool is provided for facilitating the removal of the bearing. The tool employs one or more cutter teeth which engage the swaged lip of the bearing. Axial force applied to the cutter while it is rotated effectively cuts away the annular lip thereby allowing the bearing to be pressed out of the housing. The cutter may be used in conjunction with other tool components which include (a) a bolt which extends through the center of the circular bearing, (b) centering rings which correctly orient the bolt relative to the annular lip of the bearing, (c) a nut and (d) Belleville washers which are disposed between the nut and the cutter. Tightening of the nut therefore preloads the washers against the cutter which generates the required axial force to effectively facilitate the cutting action on the lip as the cutter is rotated by means of a wrench or the like. A significant feature of the tool relates to the cutter tooth configuration which, along with the centering rings, assures that no contact with the housing by the cutter can take place during bearing removal, thereby avoiding damage to the housing.

20 Claims, 1 Drawing Sheet

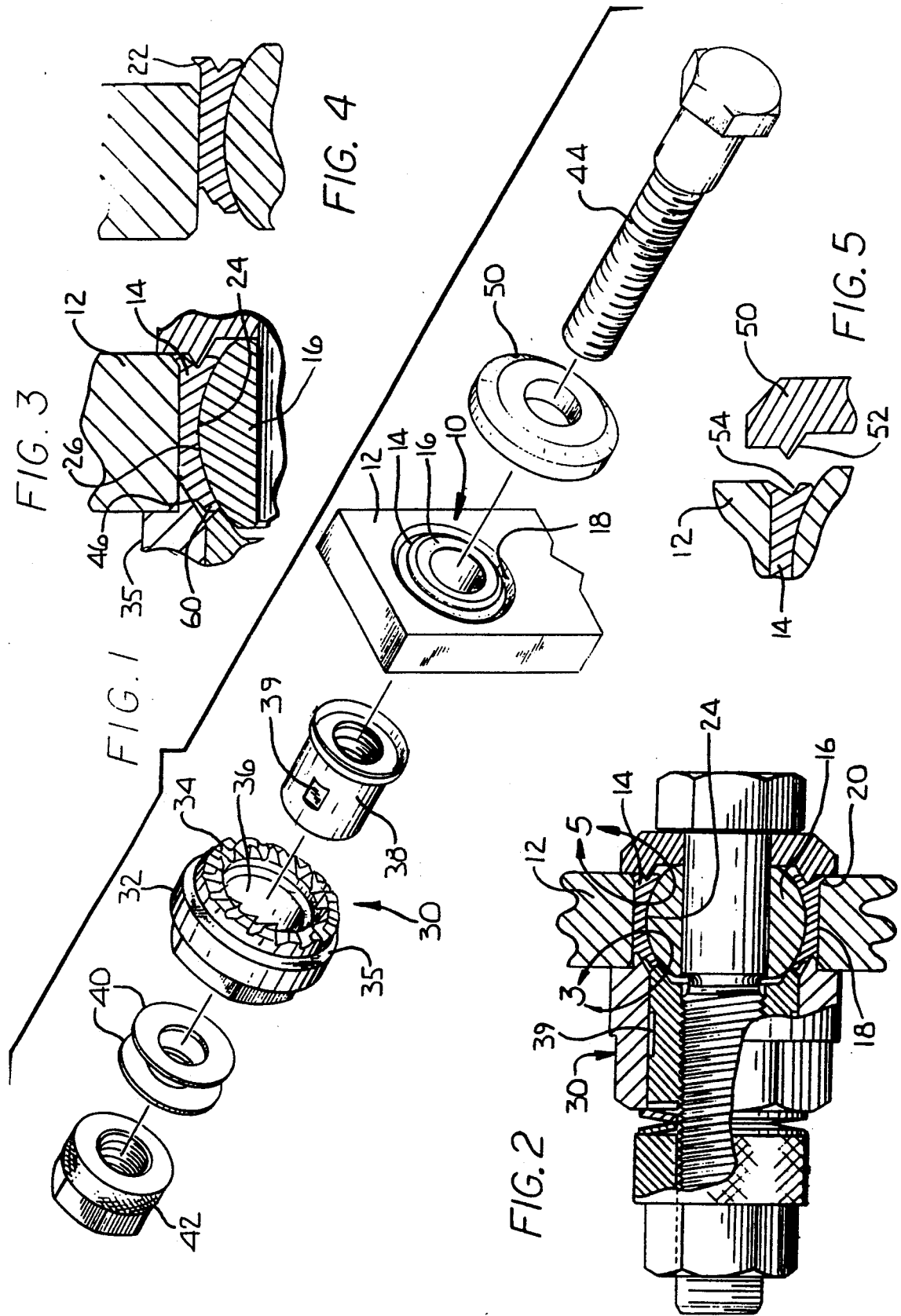

TOOL FOR REMOVING A BEARING

This invention relates to a tool for facilitating the removal of a bearing from a bearing housing. More particularly, the invention relates to a tool for cutting a bearing member to facilitate its removal from the housing. The invention also relates to a method of controlling the operation of the cutter to provide for the removal of the bearing without damaging the housing.

Bearings may provide for a movement of a rotary member relative to the bearing with little or no friction. The bearing is provided with a hollow construction to receive the rotary member. The bearing is disposed in contiguous relationship to the rotary member, is provided with a smooth surface and is made from a material providing a low coefficient of friction. In this way, the rotary member is able to move relative to the bearing with little energy loss.

To secure the bearing in the housing, an outer annular lip is provided on the bearing. The lip is swaged outwardly into a receiving chamfer, preferably conical, in the housing. Furthermore, the bearing is often made of a metal. This makes it difficult to remove the bearing from the housing without imparting some damage to the housing when replacement becomes necessary. It is particularly difficult to remove such a bearing from a housing when the housing may be large such as occurs when the housing is a structural member of an aircraft. Under such circumstances, the removal of the bearing from the housing cannot be performed on a work bench with standard machine tools.

Since bearings have been in existence for many years, a considerable effort has been made, and significant amounts of money have been expended, to provide a tool which will be portable and which will facilitate the removal of a bearing from a housing. In spite of this considerable effort and significant expenditure of money, a successful tool capable of facilitating the removal of a bearing, preferably spherical, from a housing without affecting the physical condition of the housing has not been provided until now.

In one embodiment of the invention, a bearing may consist of an inner and an outer race. The inner race or rotary member preferably may have a spherical outer surface which mates with, and is free to move relative to, the inner surface of the outer race. The bearing may be attached at its outer periphery to a housing. The bearing has an annular groove forming a lip about one or both ends of its outer cylindrical surface in abutting relationship with a chamfer, preferably conical, at one or both ends of the housing. A tool is provided for facilitating the removal of the bearing from the housing, particularly when the bearing is metallic.

The tool includes a cutter member having at least one axially extending tooth on its outer periphery. The cutter member is adapted to be disposed, and is free to turn, on a support member so that the tooth abuts the bearing at one axial end of the bearing at a position such that the outer peripheral surface of the tooth is slightly smaller than the inner diameter of the housing. The support member is preferably threaded on a bolt which passes through the inner diameter of the bearing. The support member is tightened against the bearing to assure that the tool is rigidly in place and properly aligned. In this way, by rotating the cutter with sufficient axial force applied, the bearing lip will be essentially severed from the bearing.

Springs such as those created by Belleville washers may be tightened axially against the cutter member with a controlled force as by a nut threaded on the end of the bolt. At the opposite axial end of the bolt, a face support may be disposed against the bearing and the housing and may be provided with a projection, preferably annular, to mate with a recess, preferably annular, in the bearing to precisely position the cutter member radially relative to the bearing and the housing bore.

The cutter member is rotated about the support member to produce an annular cut through the lip of the bearing. A flap is accordingly produced by the cut lip of the bearing. The depth of the cut is limited by a shoulder on the cutter member adjacent to the teeth. This flap yields easily when the bearing is moved axially from the housing, thereby facilitating the removal of the bearing from the housing. With the lip thus essentially severed from the bearing without any damage to the housing, there is little tendency for the housing to be scored or otherwise damaged as the bearing is pressed outwardly from the housing.

IN THE DRAWINGS

FIG. 1 is an exploded perspective view of a tool constituting one embodiment of the invention, the tool being positioned relative to a housing and a bearing to provide a cut in the annular lip of the bearing for facilitating the removal of the bearing from the housing without damaging the housing;

FIG. 2 is a sectional view of the tool, the housing, the rotary member and the bearing after the tool has provided the cut in the bearing;

FIG. 3 is an enlarged sectional view of the cut produced in the bearing by a cutter member included in the tool for facilitating the removal of the bearing from the housing and is taken on the circular line 3 in FIG. 2;

FIG. 4 is an enlarged sectional view similar to that shown in FIG. 3 but showing the position of the portion of the bearing adjacent the housing after the bearing has been partially removed from the housing; and FIG. 5 is an enlarged fragmentary sectional view of another portion of the tool, the housing and the bearing and is taken in the area designated by the circular line 5 in FIG. 2.

In one embodiment of the invention, a bearing installation generally indicated at 10 is provided. The bearing installation 10 includes a housing 12 and a bearing 14 including a rotary member 16. The housing 12 is provided with an annular opening 18. The housing 12 is chamfered as at 20 (FIG. 2) to receive lips 22 (FIG. 4) on the bearing 14 for holding the bearing in fixed relationship to the housing.

The bearing outer member or race 14 is supported by the housing 12 within the opening 18 and is hollow, preferably with a convex inner periphery 24. The bearing 14 is preferably made from a suitable metallic material such as aluminum or steel. The rotary member or inner race 16 also preferably has a spherical surface 26 which abuts and matches the convex inner periphery 24 of the bearing 14. The convex inner periphery 24 of the bearing 14 provides a low friction surface relative to the rotary member 16 when the rotary member rotates.

Because of the holding relationship between the chamfers 20 in the housing 12 and the lips 22 in the bearing 14, it is difficult to remove the bearing from the housing when the bearing becomes worn. To facilitate the removal of the bearing 14 from the housing 12, a tool generally indicated at 30 and constituting one embodiment of the invention is provided. The tool 30 includes a cutter member 32, preferably annular on its outer periphery.

At least one tooth 34 extends axially outwardly from one end of the cutter member 32. The tooth 34 is disposed and shaped as by a taper to cut the lip 22 of the bearing 14 at a position near the housing 12. The tooth 34 is disposed and shaped to assure that the tooth will not damage the housing while making such cut in the lip 22 when the tool assembly is properly installed. The tooth 34 is shaped to make an inwardly tapered cut axially into the bearing 14 at the position of the lip 22 when the cutter member 32 is rotated. Preferably a plurality of teeth 34 are provided on the periphery of the cutter member 32. The outer periphery of the teeth is cylindrical and has a radius slightly smaller than the housing bore. When a plurality of teeth 34 are provided, they are preferably spaced equally around the annular periphery of the cutter member 32 and are provided with the same shape and the same radial disposition as the single tooth 34 described above. The cutter member 32 has a shoulder 35 which extends radially from the periphery of the cutter member at an axial position corresponding to the tooth 34 to limit the axial movement of the tooth 34 into the lip 22. In this way, the tooth 34 on the cutter member 32 is prevented from damaging the housing 12.

The cutter member 32 is hollow as at 36 so as to be disposed on a support member 38. The support member 38 is threaded onto a bolt 44 and tightened against the bearing 14. The support member 38 is provided with a flat 39 so that it can be gripped by a wrench or the like to provide such tightening. At least one collar 40 having springlike properties in the axial direction is disposed on the bolt 44 at a position abutting the cutter member 32. The collar 40 may preferably be a Belleville washer. Preferably at least two (2) Belleville washers are provided in abutting relationship. A nut 42 is disposed against the collar 40 and is threaded on the bolt 44 so as to provide an adjustable tightening of the cutter member 32 axially against the bearing 14. The force of the collar 40 against the cutter member 32 is adjusted so that the cutter member 32 may be rotated, as by a wrench or the like, with a controlled force to cut the bearing 14. In this way, a wedge-shaped portion, defined by a surface 46 (FIG. 3, is removed from the bearing without damaging the housing 12. Any damage to the housing 12 is inhibited by the action of the shoulder 35 in limiting the axial movement of the tooth 34 into the lip 22 in the bearing 14.

A face support 50 is adapted to be disposed against the bearing 14 at the axial end of the bearing opposite the cutter member 32. The face support 50 is provided with a projection 52 which (FIG. 5) seats in an annular recess 54 in the bearing 14. In this way, the projection 52 positions the bearing 14 so that the cutter member 32 will be able to cut the portion, defined by the surface 46, from the bearing at the position of the lip 22 when the cutter member is rotated. In this way, the bearing 14 including the rotary member 16 may be easily removed from the housing 12 as shown schematically in FIG. 4.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:
1. In combination for removing an inner annular bearing from an outer annular housing disposed radially outwardly from the bearing and having a chamfer for receiving a lip in the bearing to hold the bearing and the housing in an assembled relationship,
   a rotatable cutter member having at least one tooth disposed to engage the bearing at a position near, but radially inwardly from, the chamfer in the housing and to produce an axial cut in the bearing to facilitate the removal of the lip from the bearing and the removal of the bearing from the housing,
   first means for accurately positioning the cutter member radially relative to the bearing, and
   second means for providing for a controlled tightening of the cutter member axially against the bearing to facilitate the production of the cut in the bearing radially inwardly from the chamfer in the housing.

2. In a combination as recited in claim 1,
   the cutter member having an external annular periphery and the at least one tooth extending axially from the cutter member at the annular periphery of the cutter member at a radius less than, but near, the radius of the housing.

3. In a combination as set forth in claim 1 wherein the at least one tooth of the cutter member is shaped, and means are provided on the cutter member, to produce the cut in the bearing at a radial position in the bearing inwardly from the housing, and means are provided on the cutter member through an axial distance to facilitate the removal of the lip of the bearing through a limited axial distance without damaging the housing so that the bearing can be removed axially from the housing.

4. In a combination as set forth in claim 3,
   the first means including means for positioning the bearing radially relative to the housing at the opposite axial end of the bearing from the cutter member to provide for the cutting of the bearing by the cutter member at a particular radial position on the bearing near the housing but radially inwardly from the housing.

5. In a combination as set forth in claim 4 wherein the bearing has an annular recess at the axial end opposite the rotatable cutter member, and
   the first means has an annular projection for seating in the annular recess in the bearing at the opposite axial end from the cutter member to position the cutter member for making the cut in the bearing at the particular radial position near the housing but radially inwardly from the housing.

6. In a combination as set forth in claim 5 wherein the means providing for the limited axial movement of the rotatable cutter member includes an annular shoulder to limit the axial movement of the at least one tooth into the lip in the bearing for preventing the housing from being damaged.

7. In a combination as set forth in claim 6 wherein means having springlike properties in the axial direction are associated with the cutter member to provide the cutter member with a controlled force in the axial direction to cut the bearing.

8. In combination for removing an annular bearing from an annular housing disposed radially outwardly from the bearing and having a chamfer for receiving a lip in the bearing to hold the bearing and the housing in an assembled relationship, rotary cutter means disposed on a first axial side of the bearing for cutting the bearing axially at a particular position on the bearing near, but radially inward from, the housing to facilitate the removal of the lip from the bearing, first means disposed on the opposite axial side of the bearing from the first axial side for fixedly positioning the rotary cutter in a particular radial relationship to the housing, and second means disposed relative to the rotary cutter means and movable relative to the rotary cutter means in the axial direction to provide for a controlled force by the rotary cutter means against the bearing, upon a rotation of the rotary cutter means, to facilitate the removal of the lip from the bearing without damaging the housing.

9. In a combination as set forth in claim 8, the bearing defining an annular recess at the axial end of the bearing opposite the rotary cutter means, the first means being shaped for disposition in the recess for fixedly positioning the bearing radially relative to the rotary cutter means, the rotary cutter means being provided with at least one tooth extending axially from the rotary cutter means at a position for engaging the bearing at a position near, but radially inward from, the housing to cut the bearing annularly at this radial position upon a rotation of the rotary cutter means for removing the lip from the bearing without damaging the housing.

10. In a combination as set forth in claim 8, the second means including at least one collar having springlike properties in the axial direction and further including means coupled to the collar and adjustable axially in position relative to the collar and the rotary cutter means for producing an adjustable axial force on the rotary cutter means to control the axial force exerted by the rotary cutter means on the bearing for cutting the bearing axially to remove the lip from the bearing when the rotary cutter means is rotated.

11. In a combination as set forth in claim 10 wherein the at least one tooth on the rotary cutter means tapers radially toward a point in the axial direction to facilitate the axial cutting of the bearing and the resultant production of a removable flap in the bearing when the rotary cutter means is rotated.

12. In a combination as set forth in claim 11 wherein the rotary cutter means has a shoulder at an axial position defining the axial beginning of the at least one tooth to limit the axial movement of the at least one tooth into the lip in the bearing for preventing the housing from being damaged.

13. In a combination as set forth in claim 11 wherein the bearing defines an annular recess at the axial end of the bearing opposite the rotary cutter means and wherein the first means is shaped for disposition in the recess for fixedly positioning the bearing radially relative to the rotary cutter means and wherein the rotary cutter means is provided with at least one tooth extending axially from the rotary cutter means at a position for engaging the bearing at a position near, but radially inward from, the housing to cut the bearing annularly at this radial position upon a rotation of the rotary cutter means for removing the lip from the bearing.

14. A method of removing an annular bearing from an annular housing disposed radially outwardly from the bearing and having a chamfer for receiving a lip in the bearing to hold the bearing and the housing in an assembled relationship, including the following steps:

providing a cutter member having at least one axial tooth at a peripheral position corresponding to a position near, but radially inward from, the housing at one axial end of the bearing, positioning the cutter member so that the at least one tooth on the cutter member axially abuts the bearing at the one axial end of the bearing, positioning the cutter member radially relative to the housing to provide for a cut in the bearing without damaging the housing, providing a controlled axial force of the at least one tooth on the cutter member against the bearing, and rotating the cutter member against the bearing to cut the lip in the bearing, thereby facilitating a removal of the bearing from the housing.

15. A method as set forth in claim 14 wherein the bearing is removed axially from the housing after the lip in the bearing has been cut.

16. A method as set forth in claim 14 wherein the force of the at least one tooth on the cutter member against the bearing is adjustably regulated axially before the cutter member is rotated to remove the lip from the bearing.

17. A method as set forth in claim 16 wherein the bearing is provided with an annular recess at the axial end opposite the cutter member and the annular recess is used to radially position the bearing to prevent the cutter member from damaging the housing.

18. A method as set forth in claim 16 wherein the bearing is positioned radially on the side axially opposite the cutter member to fixedly position the cutter member in a particular relationship to the bearing to prevent the housing from being damaged.

19. A method as set forth in claim 18 wherein the axial movement of the at least one tooth on the cutter member into the lip in the bearing is limited to prevent the housing from being damaged.

20. A method as set forth in claim 18 wherein the bearing is removed axially from the housing after the lip in the bearing has been cut.

* * * * *